United States Patent
Huang et al.

(10) Patent No.: US 12,415,168 B1
(45) Date of Patent: Sep. 16, 2025

(54) LIQUID AERATION AND MIXING APPARATUS FLOAT MOUNT FOR WRAP-AROUND HAND RAIL AND GRATING

(71) Applicant: Newterra Corporation, Inc., Chicago, IL (US)

(72) Inventors: Jing Huang, Chaska, MN (US); Raymond P. Hedelson, Minnetrista, MN (US)

(73) Assignee: NEWTERRA CORPORATION, INC., Chicago, IL (US)

( * ) Notice: Subject to any disclaimer, the term of this patent is extended or adjusted under 35 U.S.C. 154(b) by 765 days.

(21) Appl. No.: 17/831,304

(22) Filed: Jun. 2, 2022

(51) Int. Cl.
| | | |
|---|---|---|
| *B01F 33/503* | (2022.01) | |
| *B01F 23/233* | (2022.01) | |
| *B01F 27/113* | (2022.01) | |
| *B01F 35/43* | (2022.01) | |
| *B01F 101/00* | (2022.01) | |
| *C02F 3/20* | (2023.01) | |

(52) U.S. Cl.
CPC .......... *B01F 33/503* (2022.01); *B01F 23/233* (2022.01); *B01F 27/113* (2022.01); *B01F 35/43* (2022.01); *C02F 3/20* (2013.01); *B01F 2101/305* (2022.01)

(58) Field of Classification Search
CPC .... B01F 33/503; B01F 23/233; B01F 27/113; B01F 35/43; B01F 2101/305; C02F 3/20; E04F 11/1812; B63B 35/00
USPC ....... 210/242.1, 170.05, 170.02, 170.09, 150
See application file for complete search history.

(56) References Cited

U.S. PATENT DOCUMENTS

| | | |
|---|---|---|
| 3,548,770 A | 12/1970 | Boutros |
| 3,884,807 A | 5/1975 | Heddon |
| 3,909,416 A | 9/1975 | In't Veld |
| 4,157,304 A | 6/1979 | Molvar |
| 4,210,534 A | 7/1980 | Molvar |
| 4,229,302 A | 10/1980 | Molvar |
| 4,448,689 A | 5/1984 | von Nordenskjold |
| 4,587,064 A | 5/1986 | Blum |
| 4,741,825 A | 5/1988 | Schiller |

(Continued)

OTHER PUBLICATIONS

"AIRE-O2 Horizontal Aspirator Aerator/Mixer", Aeration Industries International, 6 pgs.

(Continued)

*Primary Examiner* — Terry K Cecil
(74) *Attorney, Agent, or Firm* — Albert W. Watkins (57) ABSTRACT

A wrap-around hand rail and grating has a walkway grating coupled with and suspended upon a float assembly frame and float combination that is also suspending a liquid aeration apparatus used to treat a liquid. The grating defines a lightweight, strong, splash resistant horizontal platform that attaches readily to the upper portion of the float assembly frame with either fixed or readily removable fasteners such as pins. A railing attaches to the splash resistant platform using a coupler that sandwiches the grating, thereby transmitting extreme forces through the larger grating. A moveable bridge grating and moveable or flaccid rails are placed in regions of the platform that need to be removed or repositioned, for example to provide access to the aeration apparatus or to allow a person to enter or exit the platform. Both the railing and splash resistant platform are readily adapted to various aeration unit and float combinations.

16 Claims, 4 Drawing Sheets

(56) References Cited

U.S. PATENT DOCUMENTS

| | | |
|---|---|---|
| 4,806,251 A | 2/1989 | Durda |
| 4,882,099 A | 11/1989 | Durda et al. |
| 4,997,557 A | 3/1991 | Andersen |
| 5,078,923 A | 1/1992 | Durda et al. |
| 5,185,085 A | 2/1993 | Borgren |
| 5,228,998 A | 7/1993 | DiClemente et al. |
| 5,330,639 A * | 7/1994 | Murphree ............... B63B 35/32 210/219 |
| 5,354,457 A | 10/1994 | Becchi |
| 5,744,072 A | 4/1998 | Karliner |
| D401,547 S | 11/1998 | Karliner |
| 5,868,091 A | 2/1999 | Gross et al. |
| 5,942,161 A | 8/1999 | Pate |
| 5,948,326 A | 9/1999 | Pate |
| 6,231,766 B1 | 5/2001 | Hausin |
| 6,325,842 B1 | 12/2001 | Caldwell et al. |
| 6,576,141 B2 | 6/2003 | Turner, Jr. et al. |
| 6,613,232 B2 | 9/2003 | Chesner et al. |
| 6,821,426 B1 | 11/2004 | Hausin et al. |
| 6,824,124 B2 | 11/2004 | Henley |
| 6,994,329 B2 | 2/2006 | Kronawitter |
| 7,045,058 B2 | 5/2006 | Walczyk |
| 7,048,260 B2 | 5/2006 | Gross et al. |
| 7,172,177 B2 | 2/2007 | Durda |
| 7,267,325 B2 | 9/2007 | Tsai |
| 7,441,754 B2 | 10/2008 | Trentadue et al. |
| 7,465,394 B2 | 12/2008 | Durda et al. |
| 7,520,493 B1 | 4/2009 | Haldane |
| 7,678,274 B2 | 3/2010 | Durda et al. |
| 7,686,284 B2 | 3/2010 | Henley |
| 7,892,433 B2 | 2/2011 | Durda et al. |
| 8,011,642 B2 | 9/2011 | Tsai et al. |
| 8,016,273 B1 | 9/2011 | Dartez |
| 8,066,873 B2 | 11/2011 | Kaw |
| 8,110,108 B2 | 2/2012 | Durda et al. |
| 8,236,174 B2 | 8/2012 | Durda et al. |
| 8,302,940 B2 | 11/2012 | Chen |
| 8,691,092 B2 | 4/2014 | Streb |
| 10,814,294 B1 | 10/2020 | Huang |
| 2003/0030157 A1 | 2/2003 | Petrescu et al. |
| 2010/0041285 A1 | 2/2010 | Riggs |

OTHER PUBLICATIONS

"Stormix 3.0", Bioremedy—Submersible Aspiration Aerator, 2009, 1 pg, http://bioremedy.com.au/menu/industrial/aeration/p-stormix-3.html, downloaded Jan. 19, 2016.

Biowater Systems Waste Water Treatment, 4 pgs, http://biowater.co.za, downloaded Jan. 19, 2016.

"AIRE-O2 Triton Process Aerator/Mixer", Brochure, Aeration Industries International, 2012, 8 pgs.

"AIRE-O2 Triton Process Aerator/Mixer", Product Sheet, Aeration Industries International, 2014, 2 pgs.

* cited by examiner

LIQUID AERATION AND MIXING APPARATUS FLOAT MOUNT FOR WRAP-AROUND HAND RAIL AND GRATING

BACKGROUND OF THE INVENTION

1. Field of the Invention

The present invention pertains generally to gas and liquid contact apparatus, and more particularly to such apparatus using a rotating impeller to deliver a gas at a submerged location. In a further manifestation, a gas and liquid contact apparatus is combined with a floating machinery support providing a wrap-around rail and grating to facilitate installing, adjusting, and servicing the apparatus. In another manifestation, the present invention pertains generally to liquid purification or separation, with means to add a treating gas directly to the liquid through a submerged fluid inlet and further combined with a floating machinery support, a floor grating coupled to the floating machinery support, and a safety rail coupled to the floor grating. In yet another manifestation, the present invention pertains to an aerator for treatment of fluid, further combined with a floating machinery support, a wrap-around rail, and floor grating to facilitate installing, adjusting, and servicing the apparatus.

2. Description of the Related Art

Aeration apparatus and processes are utilized in the treatment of fluid, typically for the purpose of mixing and increasing the dissolved oxygen (DO) content of the fluid but for other purposes as well. When used in a waste water treatment process, bacteria and other microorganisms are supplied with dissolved oxygen to break down organic matter within the waste water in a purification process. Most commonly in wastewater processing, increased oxygen content of the wastewater increases the activity of aerobic bacteria. The increased aerobic bacterial activity helps to clean and purify the wastewater before it is treated using other means, or released into the ecosystem such as through a river. In aquiculture applications, aeration processes are used to increase dissolved oxygen to support increased production of fish and other aquatic organisms. There are many other applications where it is desirable to introduce air into a liquid.

While most applications depend upon dissolving at least a portion of the oxygen contained in the air into the liquid, there are at least some applications where the mixing of the air into the liquid is the important objective. In other applications the ability to both mix without aeration and also mix with aeration is highly desirable. For yet other applications, a gas other than air may be introduced to meet a particular need or desire. The liquid being treated, for exemplary purposes only and not limiting the present invention thereto, often will be contained in one or more ponds, lakes, wastewater lagoons, or various ones of other liquid holding tanks or reservoirs for sewage treatment plants or other diverse application.

A common way to increase oxygen content is to provide an aeration unit mounted to a floating object. The aeration unit will typically include a motor driving a propeller. As the propeller turns, air is actively or passively mixed into the turbulent water and propelled into the water, normally at a downward and lateral angle. For most applications, several horsepower may be required for adequate aeration. For larger commercial applications, there may be a plurality of aeration units provided at different locations about a lagoon or reservoir.

One exemplary known type of aeration apparatus is an aspirator type aerator. These devices use a motor-driven rotating impeller disposed below the surface of the substance being treated. The impeller moves the fluid being treated past a port coupled to atmospheric air through a draft tube. In doing so, the moving liquid generates sufficient suction to draw air into the tube and into the liquid being treated. Impeller type aerators may be operated generally horizontally, creating a horizontal rather than a vertical flow pattern within a treatment basin. As may be appreciated, in these aspirator systems the impeller is designed to generate substantial suction, while still trying to preserve good mixing of the air or other gas into the liquid.

Another exemplary known type of aeration apparatus is a blower-assisted impeller aerator. Blower-assisted impeller aerators use a blower to force air through a draft tube and into the liquid, while the impeller moves the liquid and facilitates thorough mixing between liquid and gas.

A further exemplary known type of aeration apparatus is a surface splasher aerator. This type of aerator uses a motor to drive an impeller that moves liquid through the air. In some cases the surface splasher simply extracts oxygen from the air, and in other cases the surface splasher is used to strip volatile components from the liquid.

While nearly any type of motor may find application in the aeration apparatus, most are electrically driven. Once connected to an electrical grid, there is a steady and continuous source of power, without the need for periodic refueling required by most gasoline or diesel engines. In addition, electric motors generally require substantially less maintenance than gasoline or diesel engines. However, with the benefit of long-term, low maintenance aeration comes the need to keep an electrical motor safely and reliably connected to the electrical grid. This means that it is normally desirable to keep the aeration unit anchored or relatively stationary, with the electrical components above the highest liquid level to avoid unnecessary risks or hazards.

Aeration apparatuses are a part of an industry that has been well-developed over the last four decades, with many advances made both by the present assignee and by others in the industry. Exemplary US patents owned by the present assignee that illustrate floating aeration apparatus, the teachings and contents which are incorporated herein by reference, include: U.S. Pat. No. 4,741,825 by Schiller, entitled "Mobile vortex shield"; U.S. Pat. No. 4,806,251 by Durda, entitled "Oscillating propeller type aerator apparatus and method"; U.S. Pat. No. 4,882,099 by Durda et al, entitled "Aeration apparatus having a deicing mechanism and control circuit therefor"; U.S. Pat. No. 5,078,923 by Durda et al, entitled "Aeration apparatus having a deicing mechanism and control circuit therefor"; U.S. Pat. No. 5,744,072 by Karliner, entitled "Method of treating waste water"; U.S. Pat. No. 7,465,394 by Durda et al, entitled "Wastewater treatment system"; U.S. Pat. No. 7,678,274 by Durda et al, entitled "Wastewater treatment system"; U.S. Pat. No. 7,892,433 by Durda et al, entitled "Wastewater treatment system"; U.S. Pat. No. 8,110,108 by Durda et al, entitled "Wastewater treatment system"; U.S. Pat. No. 8,236,174 by Durda et al, entitled "Wastewater treatment system"; U.S. Pat. No. 10,814,294 by Huang, entitled "Pivotal rigid vortex shield"; and Des U.S. Pat. No. 401,547 by Karliner, entitled "Aerator float".

Exemplary US patents and published applications owned by others that illustrate floating aeration apparatus, the teachings and contents which are incorporated herein by reference, include: U.S. Pat. No. 4,587,064 by Blum, entitled "Aeration apparatus for large waters"; U.S. Pat. No. 4,997,557 by Andersen, entitled "Floating, mixing, aerating and decanting unit"; U.S. Pat. No. 5,354,457 by Becchi, entitled "Water treatment equipment"; U.S. Pat. No. 5,868,091 by Gross et al, entitled "Float mounted aerator having a work deck"; U.S. Pat. No. 5,942,161 by Pate, entitled "Device and process for liquid treatment"; U.S. Pat. No. 5,948,326 by Pate, entitled "Device and process for liquid treatment"; U.S. Pat. No. 6,325,842 by Caldwell et al, entitled "Method and apparatus for aerating"; U.S. Pat. No. 6,824,124 by Henley, entitled "Aerator and mixer"; U.S. Pat. No. 6,994,329 by Kronawitter, entitled "Floating paddlewheel aerator"; U.S. Pat. No. 7,048,260 by Gross et al, entitled "Turbocharged aerator"; U.S. Pat. No. 7,267,325 by Tsai, entitled "Aeration method of pool water and apparatus thereof"; U.S. Pat. No. 7,520,493 by Haldane, entitled "Floating diffused air aerator"; U.S. Pat. No. 7,686,284 by Henley, entitled "Aerator and mixer"; U.S. Pat. No. 8,011,642 by Tsai et al, entitled "Cruising aerator"; U.S. Pat. No. 8,016,273 by Dartez, entitled "Aerator"; U.S. Pat. No. 8,066,873 by Kaw, entitled "Floating bioreactor system"; U.S. Pat. No. 8,302,940 by Chen, entitled "Energy-saving and wind-powered aerator"; U.S. Pat. No. 2003/0030157 by Petrescu et al, entitled "Horizontal surface aerator"; and U.S. Pat. No. 2010/0041285 by Riggs, entitled "Autonomous vehicle with fuel cell and autonomous flushing system".

A variety of support anchors and floats are illustrated in the aforementioned patents, and these support anchors and floats have generally performed quite well over the years. Nevertheless, these floating aeration units can be difficult to set up, test, and maintain. When a person is working in a water treatment facility, there are multiple hazards including most notably the water undergoing treatment. Since humans can neither breathe in water nor appreciate being immersed in contaminated liquids even if provided with protective gear, it is desirable to keep workers from accidentally falling into the water or having to intentionally immerse themselves even partially therein.

However, as evidenced by the aforementioned substantial body of patents, when working on floating platforms in water treatment lagoons and other locations it is often the case that there are no guard rails on the floating platforms. This is in part because the platforms are often designed in an open manner: to allow ready access to all components; to allow any splashed material to pass through the supporting framework of the platform; and to have minimal weight and cost. As a result, working on such platforms during set-up, testing, and maintenance can be quite precarious.

In some cases, such as illustrated by the aforementioned U.S. Pat. No. 4,587,064 by Blum, the arrangement may actually be worse than lacking a guard rail. In the case of Blum, a hazardous edge of the boat-like structure extends above the platform, but does not extend high enough to prevent a worker from accidentally going past, or over, the edge into the water treatment lagoon. In effect, the Blum configuration not only fails to achieve the goal of keeping workers safe, it can actually create a more hazardous working environment.

To address the needs of a worker, some artisans have provided some combination of grating and safety rails. An exemplary US patent owned by the present assignee that illustrates this combination, the teachings and contents which are incorporated herein by reference, is U.S. Pat. No. 7,172,177 by Durda, entitled "Aerator". In this patent, an exemplary prior art float assembly is illustrated, including a deck that is described for exemplary purposes as fabricated from steel grillwork. This patent further proposes the inclusion of railings and other amenities.

Other artisans have likewise proposed some combination of aeration and safety rails. Exemplary US patents that illustrate this combination, the teachings and contents which are incorporated herein by reference, include: U.S. Pat. No. 3,548,770 by Beutros, entitled "Adjustable pontoons for aerator"; U.S. Pat. No. 4,157,304 by Molvar, entitled "Aeration method and system"; U.S. Pat. No. 4,210,534 by Molvar, entitled "Multiple stage jet nozzle and aeration system"; U.S. Pat. No. 4,229,302 by Molvar, entitled "Waste treatment apparatus with floating platform"; U.S. Pat. No. 4,448,689 by von Nordenskjöld, entitled "Apparatus for final clearing of waste water"; U.S. Pat. No. 5,185,085 by Borgen, entitled "Water craft and method for treating a body of water"; U.S. Pat. No. 5,228,998 by DiClemente et al, entitled "Floating biological contactor"; U.S. Pat. No. 6,231,776 by Hausin, entitled "Water Treatment Process"; U.S. Pat. No. 6,821,426 by Hausin et al, entitled "Process for treating a body of water"; and U.S. Pat. No. 7,441,754 by Trentadue et al, entitled "Apparatus for introducing a gas into a body of liquid".

In addition to the aforementioned more relevant aeration-related patents, several additional patents showing less relevant and otherwise unrelated machine supports and the like that include various railings have also been identified by the present applicants, the teachings and contents which are nevertheless incorporated by reference, including: U.S. Pat. No. 3,884,807 by Heddon, entitled "Apparatus for skimming in multi-phase fluid media"; U.S. Pat. No. 3,909,416 by In't Veld, entitled "Method and apparatus for separating liquids of different specific gravities from a mixture of the same"; U.S. Pat. No. 6,576,141 by Turner et al, entitled "Apparatus and method for collecting floating debris"; U.S. Pat. No. 6,613,232 by Chesner et al, entitled "Mobile floating water treatment vessel"; U.S. Pat. No. 7,045,058 by Walezyk, entitled "Trash collection skimmer boat"; and U.S. Pat. No. 8,691,092 by Streb, entitled "Treating water using floating wetland made of plastic waste".

These patents that include some sort of railing for the floating pontoon, platform, or boat offer added worker safety. However, they each require installation at the time of manufacture of the float, using equipment custom designed for the particular float and aeration equipment geometry. Consequently, they are designed for and only useful with the one float and aeration equipment combination they are designed for. They additionally lack accommodation for movement or repositioning of the aeration machinery, interfering with or complicating maintenance. Further, many of them incorporate decking or railings that create other hazards, such as slippery surfaces, areas that are not readily cleaned or inspected, or weak points that are prone to failure.

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted in the field of aerators, there still remains a need for an adaptable guard rail and splash resistant walkway platform combination that readily attaches to a variety of aeration floats to facilitate safe access and maintenance.

SUMMARY OF THE INVENTION

In a first manifestation, the invention is, in combination, a gas and liquid contact apparatus, a treatment liquid, a floating machinery support, and a wrap-around rail and grating. The gas and liquid contact apparatus comprises a gas source providing a supply of a gas, and a means to contact the treatment liquid with the gas. The floating machinery support comprises: a plurality of floats suspending the gas and liquid contact apparatus above the treatment liquid; a float assembly frame spanning between and coupled with the plurality floats; and a plurality of float assembly frame attachment holes coupled with the float assembly frame. The wrap-around rail and grating comprises: a walkway frame; a plurality of walkway frame attachment holes coupled with the walkway frame; at least one walkway frame fastener simultaneously passing through at least one of the plurality of float assembly frame attachment holes and at least one of the plurality of walkway frame attachment holes and configured to secure the walkway frame to the float assembly frame; at least one walkway grating panel configured to support a person standing thereupon; at least one walkway grating panel fastener securing the walkway grating panel to the walkway frame; at least one riser; and at least one riser coupler securing the at least one riser to the at least one walkway grating panel.

In a second manifestation, the invention is, in combination, a liquid purification apparatus, a floating machinery support, a floor grating coupled to the floating machinery support, and a safety rail coupled to the floor grating. The floating machinery support comprises at least one float, and a float assembly frame coupled with the at least one float. The liquid purification apparatus comprises a means to add a treating gas to a liquid directly through a submerged gas outlet. The floor grating coupled to the floating machinery support comprises a walkway frame secured to the float assembly frame, and at least one walkway grating panel secured to the walkway frame and configured to support a person standing thereupon. The safety rail coupled to the floor grating comprises at least one riser, and at least one riser coupler securing the at least one riser to the at least one walkway grating panel.

In a third manifestation, the invention is, in combination, an aerator for treatment of a fluid, a floating machinery support, a wrap-around rail, and a floor grating. The aerator for treatment of a fluid comprises a motor configured to deliver air to a treatment fluid. The floating machinery support comprises at least one float configured to suspend the aerator upon the treatment fluid, and a float assembly frame coupled with the at least one float. The wrap-around rail and grating comprises a walkway grating coupled with and suspended upon the float assembly frame, and a railing coupled with and suspended upon the walkway grating.

OBJECTS OF THE INVENTION

Exemplary embodiments of the present invention solve inadequacies of the prior art by providing a lightweight, strong, splash resistant platform that attaches readily to the upper portion of a common prior art aeration unit float assembly frame. A railing attaches readily to the splash resistant platform. Both of the railing and splash resistant platform are readily adapted to meet the geometry and needs associated with a wide variety of aeration unit and float combinations.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a grating and safety railing configured for use in combination with and to accommodate a variety of diverse aeration apparatus for treating fluids, most preferably enabling the benefits of mass-produced apparatus while also enabling a precise configuration to a single particular application. As a corollary thereto, another object of the present invention is to minimally alter existing equipment, preferably facilitating both new product installations and also upgrades to existing aeration apparatuses. A further object of the invention is to improve the safety and convenience of installing, adjusting, servicing, and otherwise maintaining an aeration apparatus. Yet another object of the present invention is to achieve the foregoing objectives while preserving surface area and ease for a person to access the aeration apparatus and floating support. An additional object of the invention is to provide modular installation and separation of the grating with the float assembly, and modular installation and separation of the railing with the grating. As a corollary thereto, another object of the present invention is to couple the railing solely to the grating. As a further corollary thereto, an additional object of the invention is to couple the grating solely to and most preferably adjacent the top of the float assembly framework. A further object of the invention is to distribute forces applied to an individual railing through a relatively larger grating panel, thereby providing substantial strength and resistance to local overload in the event of an accidental impact. A further object of the invention is to provide such an apparatus that does not deleteriously affect operation of the aeration unit even in the event of lack of maintenance. Yet another object of the present invention is to require very nominal, if any, additional maintenance with the improved apparatus.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a liquid aeration and mixing apparatus float mounted wrap-around hand rail and grating 10 that mounts onto an exemplary liquid aeration and mixing apparatus floating platform 1. Liquid aeration and mixing apparatus floating platform 1, for exemplary and non-limiting purpose but to illustrate the flexibility of the teachings of the present invention, may comprise platforms such as illustrated in the present applicant's U.S. Pat. No. 4,741,825 by Schiller; U.S. Pat. No. 4,806,251 by Durda; U.S. Pat. No. 4,882,099 by Durda et al; U.S. Pat. No. 5,078,923 by Durda et al; U.S. Pat. No. 7,465,394 by Durda et al; U.S. Pat. No. 7,678,274 by Durda et al; U.S. Pat. No. 7,892,433 by Durda et al; U.S. Pat. No. 8,110,108 by Durda et al; U.S. Pat. No. 8,236,174 by Durda et al; and U.S. Pat. No. 10,814,294 by Huang; each incorporated by reference herein above. Similarly, liquid aeration and mixing apparatus floating platform 1 may, for exemplary and non-limiting purpose, comprise platforms such as illustrated in the following US patents assigned to others besides the present applicant: U.S. Pat. No. 4,997,557 by Andersen; U.S. Pat. No. 5,354,457 by Becchi; U.S. Pat. No. 5,868,091 by Gross et al; U.S. Pat. No. 6,824,124 by Henley; U.S. Pat. No. 7,048,260 by Gross et al; U.S. Pat. No. 7,267,325 by Tsai; U.S. Pat. No. 7,520,493 by Haldane; U.S. Pat. No. 7,686,284 by Henley; and U.S. Pat. No. 8,066,873 by Kaw; each also incorporated by reference herein above.

Figure 2:
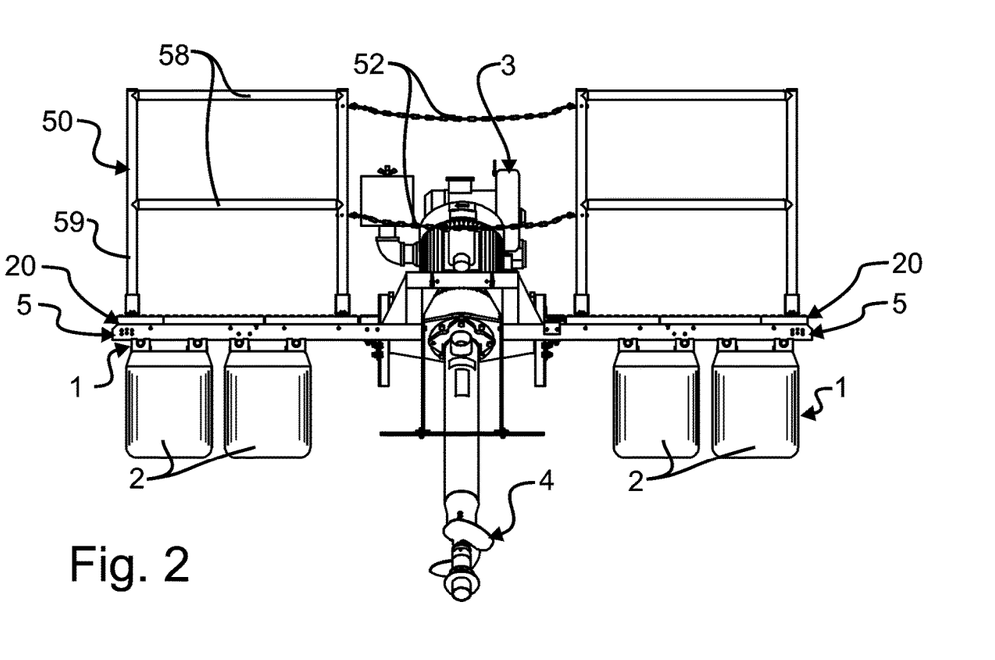
FIG. 2 illustrates the preferred embodiment liquid aeration and mixing apparatus float mounted wrap-around hand rail and grating of FIG. 1 from a front elevational view.
Figure 3:
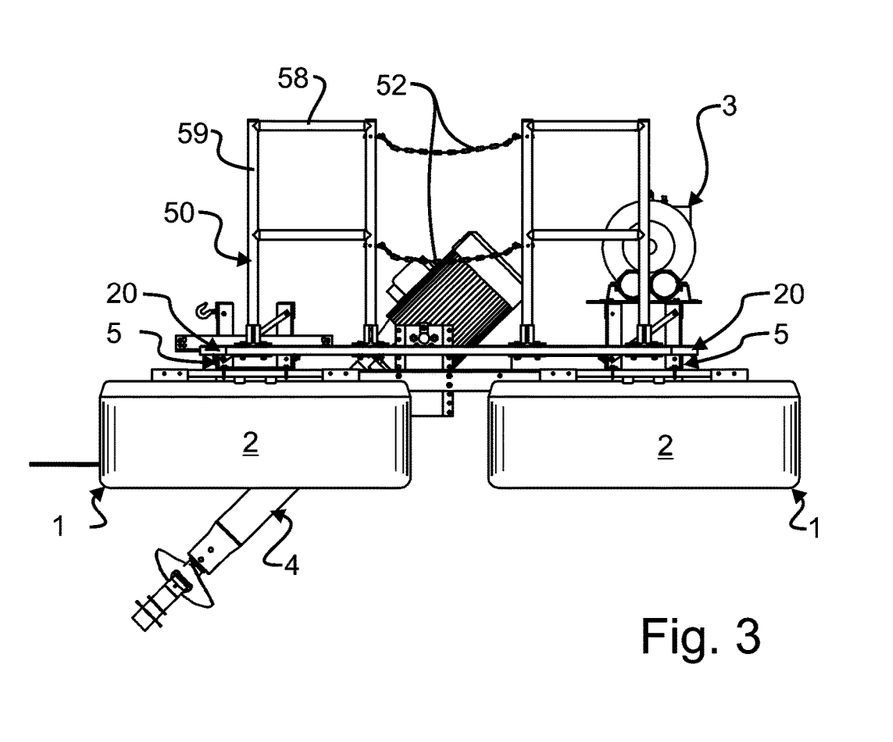
FIG. 3 illustrates the preferred embodiment liquid aeration and mixing apparatus float mounted wrap-around hand rail and grating of FIG. 1 from a side elevational view.
Figure 4:
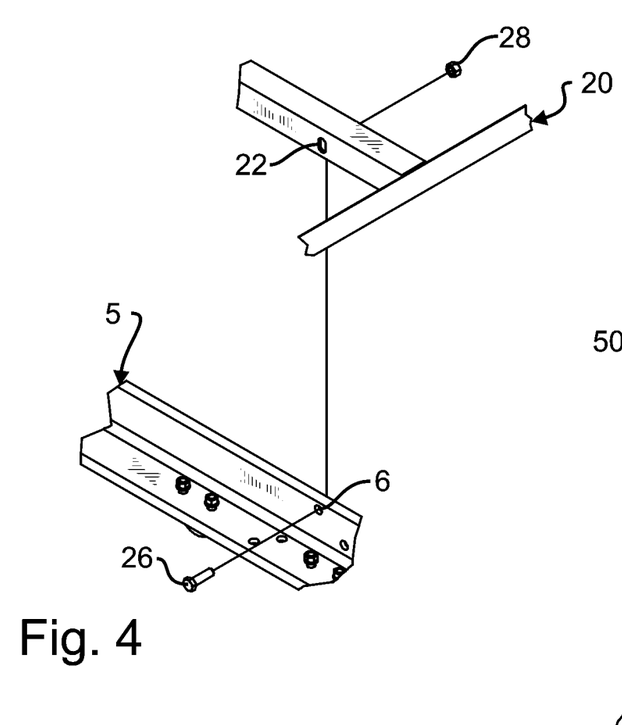
FIG. 4 illustrates a preferred connection between walkway frame and float assembly frame from an exploded and enlarged partial projected view.

An exemplary liquid aeration and mixing apparatus floating platform 1 such as illustrated in FIGS. 1-4 includes: at least one and most commonly a plurality of floats 2; a float assembly frame 5 coupled with the at least one float 2 and most commonly spanning between a plurality of floats 2; and at least one and most commonly a plurality of float assembly frame attachment holes 6. In many of the prior art liquid aeration and mixing apparatus floating platforms, an angle iron forms at least a part of float assembly frame 5. In such instances, and as best illustrated in FIG. 4, a float assembly frame attachment hole 6 in some embodiments will be simply drilled or otherwise formed through float assembly frame 5. In such embodiments, care should be taken to seal any exposed metal that may be subject to corrosion. In various embodiments, float assembly frame 5 will be fabricated from various materials, for exemplary and non-limiting purposes not only including metals such as but not limited to the angle iron already referenced, but also resins and plastics, ceramics or cementitious materials, or even combinations, laminates, or composites of any of these materials or alternatives thereto.

In other embodiments, float assembly frame 5 comprises other geometries, for exemplary and non-limiting purpose including round and oval cross-section tubing, rectangular and other polygonal cross-section tubing, and other suitable cross-sections. In such embodiments, float assembly frame 5 will be provided with any suitable attachment points that will serve the function of float assembly frame attachment hole 6 illustrated. For exemplary and non-limiting purposes, such attachment points will in some embodiments comprise a hole directly through the float assembly frame 5 formed independently of the geometry of the frame or with special features explicitly formed within float assembly frame 5 for this purpose, while in other embodiments the attachment points comprise tabs that are initially formed separate from and subsequently affixed to float assembly frame 5, such as by welding or any other suitable coupling technique, and in yet further embodiments other types of attachment points that do not comprise holes, as are known in the mechanical arts as substitutes or alternatives thereto, are used.

Figure 1:
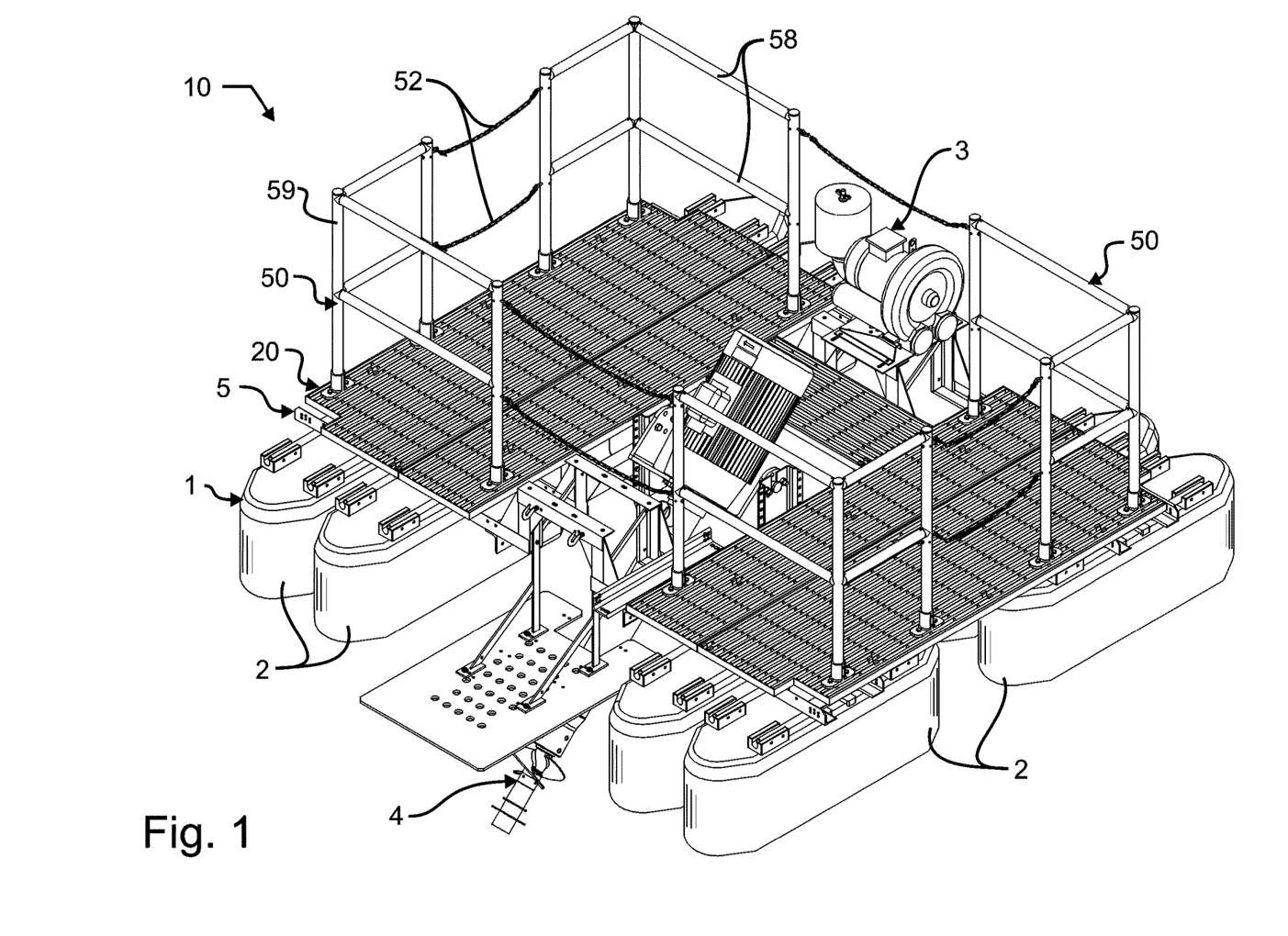
FIG. 1 illustrates a preferred embodiment liquid aeration and mixing apparatus float mounted wrap-around hand rail and grating designed in accord with the teachings of the present invention from an isometric view.

Again only for exemplary and non-limiting purpose, but to show the flexibility of the teachings of the present invention, exemplary liquid aeration and mixing apparatus floating platform 1 such as illustrated in FIGS. 1-3 also includes an aeration blower 3 and a blower-assisted impeller aerator and mixer 4 having a submerged impeller. As described herein above, there are many types of liquid aeration and mixing apparatuses that are known to those reasonably skilled in the art. Different ones of these are incorporated into various embodiments of the present invention, including for exemplary and non-limiting purpose aspirator-type aerators, blower-assisted impeller aerators, and surface splasher aerators as described herein above, each with different components and geometry.

Liquid aeration and mixing apparatus float mounted wrap-around hand rail and grating 10 is mounted preferably on the top of float assembly frame 5. Secured directly to float assembly frame 5 is a walkway frame 20. Secured within walkway frame 20 are one or more walkway grating assemblies 30. Secured to the one or more walkway grating assemblies 30 is at least one railing 50 that rises from the walkway grating assemblies 30. As illustrated in FIGS. 1-3, railing 50 in the preferred embodiment is configured as some combination of rigid railing cross bars 58 and railing risers 59. The geometry of individual rigid railing cross bars 58 and railing risers 59 is illustrated as cylindrical and of consistent lengths. Nevertheless, in some alternative embodiments the lengths and cross-sections of rigid railing cross bars 58 and railing risers 59 will be varied.

Some portions of railing 50 require ready removal or displacement. Such locations may be access points where a person would likely enter and exit from liquid aeration and mixing apparatus float mounted wrap-around hand rail and grating 10. Some locations may require movement of machinery that would be blocked by a solid railing.

To provide ready removal or displacement of portions of railing 50, preferred embodiment wrap-around hand rail and grating 10 substitutes railing chains 52 for the rigid railing cross bars 58. As visible in FIGS. 1-3, the two opposed side center portions visible in FIGS. 1 and 3 comprise railing chains, to allow a person to easily access liquid aeration and mixing apparatus floating platform 1. Similarly, the front and back center portions that are adjacent and above aeration blower 3 and blower-assisted impeller aerator and mixer 4 visible in FIGS. 1 and 2 are also replaced by railing chains, to allow the chains to be removed and the machinery to be moved or more easily serviced and maintained. As should be apparent, any portions of railing 50 that would benefit from being easily removed may include railing chains 52. In some alternative embodiments, for exemplary and non-limiting purpose, swinging gates, manually removable panels, other flaccid couplings such as ropes, cables, and the like, and other suitable apparatuses are used instead of railing chains 52.

Preferably, the preferred embodiment wrap-around hand rail and grating 10 is readily installed to an existing liquid aeration and mixing apparatus floating platform 1. In order to do so, it is very desirable to do so in the field, or more specifically in a water treatment lagoon or the like, without requiring removal of the liquid aeration and mixing apparatus floating platforms 1 from the lagoon. In order to achieve this objective, there are several requirements. The first is that the preferred embodiment wrap-around hand rail and grating 10 must be readily and quickly attached to the existing liquid aeration and mixing apparatus floating platforms 1. In addition, the components must be readily handled manually, to permit just one or two persons to carry and place the apparatus being installed. Another objective is that the installation occurs entirely above the water line against the float. Two benefits come from installation above the water line. The first is the apparent easier installation when not having to reach or work within the potentially contaminated water. The second is that an apparatus installed above the water line is less exposed to the contaminated liquid as well, meaning it is easier to clean, inspect, and maintain, and is also less likely to corrode and degrade over time, owing to the reduced exposure to the liquid.

To achieve these objectives, and as best illustrated in FIG. 4, secured directly to float assembly frame 5 is a walkway frame 20. This is accomplished by passing a fastener 26 through float assembly frame attachment hole 6 and also through walkway attachment hole 22. As illustrated, fastener 26 comprises a bolt that is secured with nut 28, but in alternative embodiments other types of suitable fasteners are used. For exemplary and non-limiting purpose, in some alternative embodiments permanent or semi-permanent fasteners such as rivets are used, and in other alternative embodiments readily removable fasteners such as a hitch pin retained in place with an R-clip or cotter pin inserted into the end of the hitch pin. Walkway frame 20 is affixed at any number of suitable attachment holes 6, 22.

Figures 5, 6:
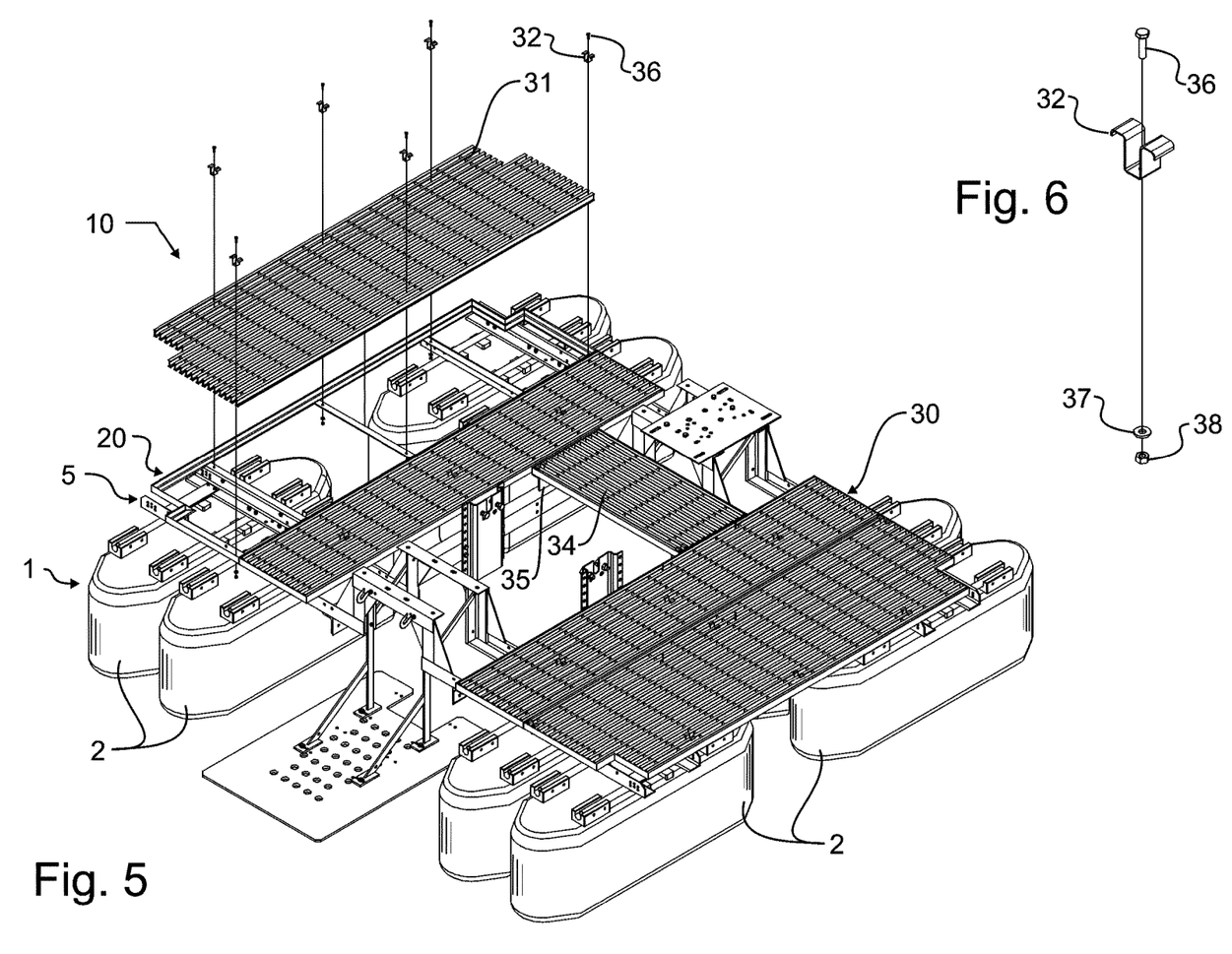
FIG. 5 illustrates the preferred embodiment liquid aeration and mixing apparatus float mounted wrap-around hand rail and grating of FIG. 1 from an isometric view, but with the aeration apparatus and railing removed, and one grating exploded.
FIG. 6 illustrates a preferred grating retention clip used to retain grating to walkway frame from an exploded and enlarged partial view.

The provision and use of these attachment holes 6, 22, and suitable fasteners at least in part achieves ready and quick attachment to existing liquid aeration and mixing apparatus floating platforms 1. In addition, and as best illustrated in FIG. 5, walkway frame 20 is preferably attached separately from the balance of preferred embodiment wrap-around hand rail and grating 10. By separating walkway frame 20 from the remainder of preferred embodiment wrap-around hand rail and grating 10, this relatively lightweight frame is much more readily handled. Further, walkway frame 20 may also be divided into several smaller frames, for exemplary and non-limiting purpose corresponding in size to each individual grating panel 31. As may further be understood, the size of walkway frame 20 is relatively independent of the dimensions of liquid aeration and mixing apparatus floating platform 1. By constructing walkway frame 20 in suitable sizes and attaching as illustrated in FIG. 4, the second objective is achieved at least in part, that the components can be readily handled manually, to permit just one or two persons to carry and place the apparatus being installed.

Continuing in FIG. 5, once walkway frame 20 is secured to liquid aeration and mixing apparatus floating platform 1, individual grating panels 31 may be installed. As illustrated in both of FIGS. 5 and 6, this installation preferably comprises the provision of a suitable number of grating retention clips 32 that are inserted into openings in grating 31. The geometry of grating retention clips 32 ensures that, when inserted into one opening, they also wrap over the top of and back into two adjacent openings within the grating. By affixing a suitable fastener 36 through both grating retention clip 32 and walkway frame 20, grating 31 is secured to walkway frame 20. Fastener 36 comprises a bolt 36, secured by a washer 37 and nut 38 in the preferred embodiment illustrated. Nevertheless, and as described herein above with regard to bolt 26 and nut 28, other suitable fasteners will be used in various alternative embodiments. This installation of individual grating panels 31 allows smaller panels to be installed, again supporting the objectives of readily and quickly attaching to the existing liquid aeration and mixing apparatus floating platforms 1, and, in addition, readily handling the components manually, to permit just one or two persons to carry and place the apparatus being installed.

While most of the grating 31 will be installed into fixed position that defines a horizontal platform upon which a person may walk, for some applications there may be portions of grating 31 and walkway frame 20 that, if fixed in position, would interfere with ordinary maintenance and operations. Such is the case with bridge grating 34 illustrated in FIG. 5. While in some alternative embodiments this bridge grating 34 will be attached in the manner of the remaining grating 31 and walkway frame 20, in preferred embodiment float mounted wrap-around hand rail and grating 10 this bridge grating 34 is instead mounted using a hinge 35. Hinge 35 is configured to permit bridge grating 34 to be lifted and rotated about the hinge axis, to re-orient from a first operative position extending horizontally over said blower-assisted impeller aerator and mixer illustrated in FIG. 5 to a second non-operative position slightly beyond vertical position that is removed from being horizontally over said blower-assisted impeller aerator and mixer.

Bridge grating 34 preferably swings through an arc of slightly more than 90 degrees. By going beyond 90 degrees, bridge grating 34 will be stable when raised, not requiring continuous support, as well as being stable when lowered. The ability to rotate bridge grating 34 allows a person to access the space immediately below bridge grating 34, and to move bridge grating 34 out of the way for exemplary and non-limiting purposes when pivoting blower-assisted impeller aerator and mixer 4 during maintenance.

While rotation of bridge grating 34 about the horizontal hinge axis of hinge 35 is preferred, in some alternative embodiments other techniques known in the mechanical arts for displacing bridge grating 34 are employed. For exemplary and non-limiting purpose, in some alternative embodiments bridge grating 34 is not rigidly affixed at all to the surrounding horizontal platform defined by walkway frame 20, and so is instead simply lifted out of place and set aside, thereby defining the second non-operative position, and when access to that which is below bridge grating 34 is no longer desired, bridge grating 34 is dropped back into the first operative position. As long as bridge grating 34 is sufficiently small and light to be readily lifted by a person, this displacement may be achieved manually. However, in yet other alternative embodiments, a crane, winch, or other apparatus is provided to assist in the movement of bridge grating 34 between the first operative position extending horizontally over said blower-assisted impeller aerator and mixer illustrated in FIG. 5 and a second non-operative position To continue with the objectives that the preferred embodiment wrap-around hand rail and grating 10 must be readily and quickly attached to the existing liquid aeration and mixing apparatus floating platforms 1, and that the components must be readily handled manually to permit just one or two persons to carry and place the apparatus being installed, railing 50 is similarly both modular and separately affixed to walkway grating assembly 30. As illustrated in FIGS. 1-3, secured to the one or more walkway grating assemblies 30 is at least one railing 50 that rises from the walkway grating assemblies 30.

Figure 7:
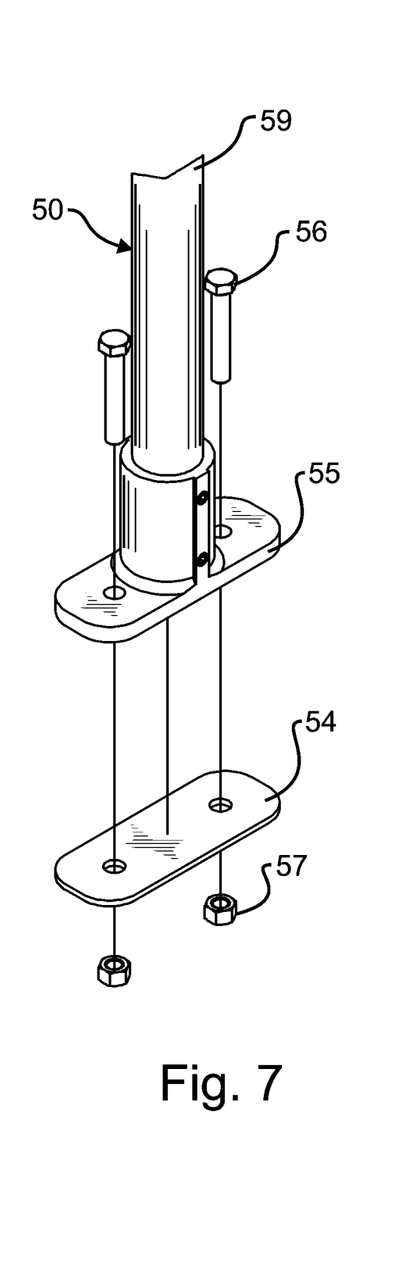
FIG. 7 illustrates a preferred railing portion including a railing base plate and railing top plate from an exploded and enlarged partial view.

To achieve this modular construction, railing 50 comprises at least in part a backer plate, such as railing base plate 54, and a railing top plate 55 that are configured to sandwich a portion of grating 31. This is achieved by passing at least one and as illustrated in FIG. 7 a pair of bolts 56 through holes in railing top plate 55, subsequently through openings in grating 31, and finally through holes in railing base plate 54. The ends of bolts 56 that pass through and are exposed beyond railing base plate 54 are secured by a suitable nut 57. While other suitable fasteners are used in alternative embodiments, the combination of bolt 56 and nut 57 or other relatively permanent and secure fastener is preferred.

In addition to other objectives, a further object of the invention is to distribute forces applied to an individual railing through a relatively larger grating panel, thereby providing substantial strength and resistance to local overload in the event of an accidental impact. One of the benefits of the construction of railing base and top plates 54, 55 is the distribution of forces spread across a relatively larger area of grating 31, particularly when compared to the most common prior art welded connection between tubing and underlying support. In other words, an ordinary prior art connection would either weld a vertical weld line along the vertical edge of riser 59, or a circle at the base of and of the same diameter as riser 59. By providing railing base and top plates 54, 55 that have more surface area in contact with grating 31 than the cross-section of riser 59, the forces applied to riser 59 distal to railing base and top plates 54, 55 are distributed over a greater area of grating 31, thereby decreasing the peak forces at any single location.

Furthermore, the grating is preferably dimensioned to be relatively lighter, meaning it also has some inherent flexibility and resilience. This combination of greater area of contact between railing 50 and grating 31 and flexibility within grating 31 means that an impact from an object or person will be better absorbed without damage. This derives from the physics equation that equates impulse with momentum, written mathematically as $ft = m\Delta v$. Since the mass of an object impacting the railing doesn't change during the impact, and since in an ideal environment the velocity is reduced from a predetermined initial velocity to zero, both the mass m and change in velocity $\Delta v$ are constant. Using these, the equation then becomes $ft = c$, where c is a constant. Anything increasing time t will thereby in turn decrease the force f that is applied to the railing. Increasing the inherent resiliency of the railing will in turn increase the time of application of the force, which using the equation $ft = c$ will in turn reducing the amount of force that is applied to the object. The present preferred coupling of railing 50 through grating 31 provides increased resilience, and thereby reduces the peak force applied when an object of predetermined velocity and mass strikes the railing. This in turn means that the resiliency of the apparatus requires less material in all of the components to safely restrain a person who might be accidentally tripping and falling, or other such impacts. This in turn is beneficial, since the weight supported by the floats is desirably as small as possible, to allow for smaller floats, less material for each of the walkway frame 20, grating assembly 30, and railing 50, and in turn lower overall cost.

Another benefit of the preferred coupling of railing 50 through grating 31 using railing base and top plates 54, 55 is that an installer may select a preferred geometry for the railing based upon the particular application or need for a floating platform 1. While the inclination is to place the outer perimeter of railing 50 adjacent to the outer perimeter of grating 31, there is no such requirement. In some alternative embodiments, there will be portions of grating 31 that extend beyond the perimeter defined by railing 50. As a reminder, and as can be understood from the foregoing descriptions herein above, the outer perimeter of grating 31 is relatively independent of the dimensions of liquid aeration and mixing apparatus floating platform 1, and is instead dependent upon the outer perimeter of walkway frame 20. Consequently, both at design time and during installation, much flexibility is provided by preferred embodiment liquid aeration and mixing apparatus float mounted wrap-around hand rail and grating 10. The particular dimensions of each of the components will be determined by their respective strengths for a particular application, since the layout of railing 50 is independent of each of float, frame, and grating, and is instead limited by the strength of grating, dimension of and strength of railing base and top plates 54, 55, and dimension and strength of railing cross bars and risers 58, 59.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a gas and liquid contact apparatus, a treatment liquid, a floating machinery support, and a wrap-around rail and grating,
   (a) the gas and liquid contact apparatus comprising:
      a gas source providing a supply of a gas; and
      a means to contact said treatment liquid with said gas;
   (b) said floating machinery support comprising:
      a plurality of floats suspending said gas and liquid contact apparatus above said treatment liquid;
      a float assembly frame spanning between and coupled with said plurality floats; and
      a plurality of float assembly frame attachment holes coupled with said float assembly frame;
   (c) said wrap-around rail and grating comprising:
      a walkway frame; a plurality of walkway frame attachment holes coupled with said walkway frame;
      at least one walkway frame fastener simultaneously passing through at least one of said plurality of float assembly frame attachment holes and at least one of said plurality of walkway frame attachment holes and configured to secure said walkway frame to said float assembly frame;
      at least one walkway grating panel configured to support a person standing thereupon;
      at least one walkway grating panel fastener securing said walkway grating panel to said walkway frame;
      at least one riser; and
      at least one riser coupler securing said at least one riser to said at least one walkway grating panel,
      wherein said at least one riser coupler securing said at least one riser to said at least one walkway grating panel further comprises:
         a riser top plate coupled with said at least one riser and affixed on a first major surface of said at least one walkway grating panel;
         a riser base plate affixed on a second major surface of said at least one walkway grating panel; and
         at least one riser fastener securing said riser top plate to said first major surface of said at least one walkway grating panel and simultaneously securing said riser base plate to said second major surface of said at least one walkway grating panel,
         wherein each of said riser top plate and said riser base plate have more surface area in contact with said at least one walkway grating panel than a cross-section of said at least one riser.

2. The combination gas and liquid contact apparatus, treatment liquid, floating machinery support, and wrap-around rail and grating of claim 1, wherein said at least one riser coupler is configured to distribute forces applied to a single one of said at least one riser through a relatively larger said at least one walkway grating panel.

3. The combination gas and liquid contact apparatus, treatment liquid, floating machinery support, and wrap-around rail and grating of claim 1, wherein said at least one riser fastener passes:
through a hole in said riser top plate;
through an opening in said walkway grating panel; and
through a hole in said riser base plate.

4. The combination gas and liquid contact apparatus, treatment liquid, floating machinery support, and wrap-around rail and grating of claim 1, wherein said at least one riser further comprises a first riser, a second riser, and a third riser, and said wrap-around rail and grating further comprises at least one rail elevated above said walkway grating panel and coupled to both of said first and second risers.

5. The combination gas and liquid contact apparatus, treatment liquid, floating machinery support, and wrap-around rail and grating of claim 4, wherein said wrap-around rail and grating further comprises at least one flaccid railing member coupled between said second and third risers.

6. The combination gas and liquid contact apparatus, treatment liquid, floating machinery support, and wrap-around rail and grating of claim 5, wherein said gas and liquid contact apparatus comprises a blower-assisted impeller aerator and mixer, and said second and third risers are on opposed sides of said blower-assisted impeller aerator and mixer.

7. The combination gas and liquid contact apparatus, treatment liquid, floating machinery support, and wrap-around rail and grating of claim 1, wherein said walkway frame fastener comprises a readily removable fastener.

8. In combination, a liquid purification apparatus, a floating machinery support, a floor grating coupled to the floating machinery support, and a safety rail coupled to said floor grating,
(a) said floating machinery support comprising:
at least one float; and
a float assembly frame coupled with said at least one float;
(b) said liquid purification apparatus comprising:
a means to add a treating gas to a liquid directly through a submerged gas outlet;
(c) said floor grating coupled to the floating machinery support comprising:
a walkway frame secured to said float assembly frame;
at least one walkway grating secured to said walkway frame and configured to support a person standing thereupon;
(d) said safety rail coupled to said floor grating comprising:
at least one riser; and
at least one riser coupler securing said at least one riser to said at least one walkway grating,
wherein said walkway grating comprises a horizontal platform and a bridge grating, said bridge grating in a first operative position extending horizontally over said liquid purification apparatus and in a second non-operative position is removed from horizontally over said liquid purification apparatus, and
wherein said walkway grating further comprises a hinge that couples said bridge grating to said horizontal platform and about which said bridge grating rotates from horizontal to vertical, thereby displacing said rotating bridge grating from said first operative position to said second non-operative position to the side of said liquid purification apparatus.

9. The combination liquid purification apparatus, floating machinery support, floor grating, and safety rail of claim 8, wherein said at least one riser further comprises a first riser, a second riser, and a third riser, and said safety rail further comprises at least one rail elevated above said walkway grating and coupled to both of said first and second risers.

10. The combination liquid purification apparatus, floating machinery support, floor grating, and safety rail of claim 9, wherein said safety rail further comprises at least one flaccid railing member coupled between said second and third risers.

11. The combination liquid purification apparatus, floating machinery support, floor grating, and safety rail of claim 10, wherein said liquid purification apparatus comprises a blower-assisted impeller aerator and mixer, and said second and third risers are on opposed sides of said blower-assisted impeller aerator and mixer.

12. The combination liquid purification apparatus, floating machinery support, floor grating, and safety rail of claim 8, further comprising at least one readily removable walkway frame fastener simultaneously passing through said float assembly frame and said walkway frame and configured to secure said walkway frame to said float assembly frame.

13. In combination, an aerator for treatment of a fluid, a floating machinery support, a wrap-around rail, and a floor grating,
(a) the aerator for treatment of a fluid comprising:
a motor configured to deliver air to a treatment fluid; and
a blower-assisted impeller aerator and mixer;
(b) said floating machinery support comprising:
at least one float configured to suspend said aerator upon said treatment fluid; and
a float assembly frame coupled with said at least one float;
(c) said wrap-around rail and grating comprising:
a walkway grating coupled with and suspended upon said float assembly frame; and
a railing coupled with and suspended upon said walkway grating,
wherein said walkway grating comprises a horizontal platform and a bridge grating, said bridge grating in a first operative position extending horizontally over said blower-assisted impeller aerator and mixer and in a second non-operative position is removed from horizontally over said blower-assisted impeller aerator and mixer, and
wherein said walkway grating further comprises a hinge that couples said bridge grating to said horizontal platform and about which said bridge grating rotates from horizontal to vertical, thereby displacing said rotating bridge grating from said first operative position to said second non-operative position to the side of said blower-assisted impeller aerator and mixer.

14. The combination aerator for treatment of a fluid, floating machinery support, wrap-around rail, and floor grating of claim 13, wherein said hinge defines a horizontal hinge axis about which said bridge grating rotates, and wherein both of said first operative position and said second non-operative position are stable.

15. The combination aerator for treatment of a fluid, floating machinery support, wrap-around rail, and floor grating of claim 13, wherein said railing comprises:
    at least a first riser, a second riser, and a third riser, each of said risers secured adjacent a bottom end to said walkway grating and rising vertically therefrom, and said second and third risers on opposed sides of said blower-assisted impeller aerator and mixer;
    at least one rigid safety rail elevated above said walkway grating and coupled to both of said first and second risers;
    at least one flaccid safety rail in a first operative position coupled between said second and third risers and extending horizontally over said blower-assisted impeller aerator and mixer and in a second non-operative position uncoupled from at least one of said second and third risers and removed from extending horizontally over said blower-assisted impeller aerator and mixer.

16. The combination aerator for treatment of a fluid, floating machinery support, wrap-around rail, and floor grating of claim 13, wherein said railing further comprises:
    at least one riser; and
    at least one riser coupler securing said at least one riser to said walkway grating;
    said at least one riser coupler comprising:
    a riser top plate coupled with said at least one riser and affixed on a first major surface of said walkway grating;
    a riser base plate affixed on a second major surface of said at least one walkway grating; and
    at least one riser fastener securing said riser top plate to said first major surface of said at least one walkway grating and simultaneously securing said riser base plate to said second major surface of said at least one walkway grating;
    wherein said at least one riser coupler is configured to distribute forces applied to said at least one riser through said at least one walkway grating.

* * * * *